US012109569B2

(12) United States Patent
Borowicz et al.

(10) Patent No.: US 12,109,569 B2
(45) Date of Patent: Oct. 8, 2024

(54) STAND FOR HANDHELD PIPETTOR

(71) Applicant: CORNING INCORPORATED, Corning, NY (US)

(72) Inventors: Karolina Borowicz, Slupno (PL); Tomasz Marcin Polaski, Warsaw (PL); Agnieszka Topolewska, Marki (PL)

(73) Assignee: CORNING INCORPORATED, Corning, NY (US)

( * ) Notice: Subject to any disclaimer, the term of this patent is extended or adjusted under 35 U.S.C. 154(b) by 203 days.

(21) Appl. No.: 17/614,909

(22) PCT Filed: Jun. 1, 2020

(86) PCT No.: PCT/US2020/035516

§ 371 (c)(1),
(2) Date: Nov. 29, 2021

(87) PCT Pub. No.: WO2020/247305

PCT Pub. Date: Dec. 10, 2020

(65) Prior Publication Data

US 2022/0234048 A1 Jul. 28, 2022

Related U.S. Application Data

(60) Provisional application No. 62/857,445, filed on Jun. 5, 2019.

(51) Int. Cl.
*B01L 9/00* (2006.01)

(52) U.S. Cl.
CPC .................................... *B01L 9/54* (2013.01)

(58) Field of Classification Search
CPC ... B01L 9/54; A47F 7/28; A47F 7/285; A47G 23/0216

(Continued)

(56) References Cited

U.S. PATENT DOCUMENTS 1,655,911 A * 1/1928 Magid .................... B43K 31/00 211/69.7
2,633,248 A * 3/1953 Goldenberg ........... A45D 34/00 211/74

(Continued)

FOREIGN PATENT DOCUMENTS

AR 241809 A1 12/1992
CN 101306397 A 11/2008

(Continued)

OTHER PUBLICATIONS

Chinese Patent Application No. 202080053860.5, Office Action dated Feb. 3, 2023, 5 pages ( English Translation Only), Chinese Patent Office.

(Continued)

*Primary Examiner* — Jennifer E. Novosad
(74) *Attorney, Agent, or Firm* — F. Brock Riggs

(57) ABSTRACT

A stand for a pipet controller includes a housing with a cradle arranged to hold a pipet controller in at least three distinct orientations relative to the housing. The at least three distinct orientations include a first orientation for storing the pipet controller when not in use, a second orientation for storing the pipet controller between intermittent uses such that a grip of the pipet controller is able to be ergonomically gripped by a user of the pipet controller, and a third orientation for storing the pipet controller such that, if a pipet is connected to a pipet connector of the pipet controller, the connected pipet does not contact the stand nor a surface supporting the base of the stand. The stand can also be a charger for charging the pipet controller in at least one orientation.

18 Claims, 5 Drawing Sheets

(58) Field of Classification Search
USPC ............ 211/60.1, 85.13, 2, 65, 74; 320/115; 422/564; 248/146, 102, 346.01, 346.03, 248/346.5
See application file for complete search history.

(56) References Cited

U.S. PATENT DOCUMENTS

| | | | | | |
|---|---|---|---|---|---|
| 3,090,590 | A * | 5/1963 | Hester | A45D 34/00 211/74 |
| 3,244,009 | A | 4/1966 | Tietje et al. | |
| 3,656,351 | A | 4/1972 | Raczak | |
| 3,964,709 | A * | 6/1976 | LaBelle | A45D 34/00 222/164 |
| D242,729 | S | 12/1976 | Kenney | |
| 4,515,334 | A * | 5/1985 | Horne | A47B 73/00 D7/619.1 |
| 4,966,241 | A * | 10/1990 | Luchinger | G01G 21/22 211/74 |
| 5,616,871 | A | 4/1997 | Kenney | |
| 5,624,043 | A * | 4/1997 | Baptista | A47G 23/0241 211/74 |
| 5,715,953 | A * | 2/1998 | Brown | A47F 7/28 211/74 |
| 5,839,712 | A * | 11/1998 | Wang | B43M 99/003 211/69.5 |
| 5,961,927 | A * | 10/1999 | Isaacs | B01L 9/54 211/60.1 |
| 5,979,675 | A * | 11/1999 | Moriarty | B01L 9/54 248/231.71 |
| 6,003,693 | A * | 12/1999 | Blickenstaff | A47G 23/0241 D7/619.1 |
| 6,090,348 | A | 7/2000 | Steele et al. | |
| 6,119,876 | A * | 9/2000 | Lacourse | B65D 1/36 211/74 |
| D460,193 | S | 7/2002 | Schieffer et al. | |
| 6,734,026 | B1 | 5/2004 | Kenney | |
| D510,629 | S | 10/2005 | Piacenza et al. | |
| 7,080,743 | B1 * | 7/2006 | Wolseth | A47B 73/004 211/74 |
| D544,609 | S | 6/2007 | Bluon | |
| 7,644,819 | B2 * | 1/2010 | Gill | B65D 85/20 206/446 |
| D620,602 | S | 7/2010 | Scordato et al. | |
| D627,478 | S | 11/2010 | Guichardon | |
| 7,984,813 | B1 * | 7/2011 | Tapager | A47G 23/02 211/74 |
| D807,525 | S | 1/2018 | Sanchez et al. | |
| 9,858,729 | B2 | 1/2018 | Keller et al. | |
| D868,287 | S | 11/2019 | Frampton | |
| 10,549,026 | B2 * | 2/2020 | Endyk | A61M 5/1782 |
| D879,318 | S | 3/2020 | Sanchez et al. | |
| 10,661,279 | B2 * | 5/2020 | Demsia | B01L 9/54 |
| 10,799,073 | B1 * | 10/2020 | Ryan | A45D 27/29 |
| D908,792 | S | 1/2021 | Hernandez et al. | |
| 11,141,497 | B2 * | 10/2021 | Varga | B01L 9/54 |
| D954,988 | S * | 6/2022 | Borowicz | D24/227 |
| D996,100 | S * | 8/2023 | Leska | D6/682.4 |
| 2006/0144168 | A1 | 7/2006 | Czernecki et al. | |
| 2012/0291567 | A1 | 11/2012 | Homberg et al. | |
| 2013/0280143 | A1 | 10/2013 | Zucchelli et al. | |
| 2018/0029040 | A1 * | 2/2018 | Driscoll | B01L 9/54 |
| 2018/0214881 | A1 * | 8/2018 | Izumo | B01L 9/54 |
| 2018/0280966 | A1 | 10/2018 | Cadotte et al. | |
| 2019/0070610 | A1 | 3/2019 | Haworth et al. | |
| 2022/0234048 | A1 * | 7/2022 | Borowicz | B01L 9/54 |

FOREIGN PATENT DOCUMENTS

| | | | | |
|---|---|---|---|---|
| CN | 107115905 | A | 9/2017 | |
| CN | 108290159 | A | 7/2018 | |
| EP | 0864364 | A2 | 9/1998 | |
| EP | 2643701 | A1 | 10/2013 | |
| EP | 2709764 | A1 | 3/2014 | |
| EP | 3275550 | A1 | 1/2018 | |
| WO | WO-2012158783 | A1 * | 11/2012 | B01L 3/0237 |
| WO | 2016/030978 | A1 | 3/2016 | |
| WO | WO-2020247305 | A1 * | 12/2020 | B01L 3/021 |

OTHER PUBLICATIONS

Corning (Registered) Stripettor (Trademark) Ultra Pipet Controller Equipment. Online, published date unknown. Retrieved on Dec. 28, 2020 from URL: https://www.coming.com/worldwide/en/products/life-sciences/products/equipment/stri pettor-ultra.html.

International Search Report and Written Opinion of the International Searching Authority; PCT/US2020/035516; Mailed Sep. 14, 2020; 8 Pages; European Patent Office.

SCILOGEX Levo Plus Motorized Pipette Filler, 74020002. Online, published date unknown. Retrieved on Dec. 28, 2020 from URL:https://www.globalindustrial.com/p/medical-lab/laboratory-equipment/le-liquid-handling-products/plus-motorized-pipette-filler-74020002?infoParam.campaignId=T9F&gclid=EAIalQobChMI_ff_4_x7QGIV-opa.

* cited by examiner

STAND FOR HANDHELD PIPETTOR

CROSS REFERENCE TO RELATED APPLICATIONS

This is a national stage application under 35 U.S.C. § 371 of International Application No. PCT/US2020/035516, filed Jun. 1, 2020, which claims the benefit of priority under 35 U.S.C. § 120 of U.S. Provisional Application Ser. No. 62/857,445 filed on Jun. 5, 2019, the content of which is relied upon and incorporated herein by reference in its entirety.

FIELD OF THE DISCLOSURE

This disclosure general relates to an apparatus for holding a handheld pipettor. In particular, the present disclosure relates to pipettor stands and/or chargers with multiple pipettor storing positions, and methods of using the same.

BACKGROUND

The pipetting of fluids, for example, in laboratory environments, has been accomplished by a variety of methods, including those using a variety of mechanical pipetting devices. Various mechanical devices such as pipet controllers, pipet guns, or pipettors are known which use vacuum and air pressure for aspirating and discharging fluids, for example, drawing liquids into and expelling liquids from pipets. A typical pipettor comprises a hand-held unit in communication with a laboratory pipet at one end that is pneumatically connected to a remote or local air pressure source. Trigger-operated valves located within the pipettor regulate the flow of air through the pipettor and to the pipet to control either the intake or expulsion of liquid through the pipet. The operator may regulate air flow to the pipet by depressing either a positive pressure trigger or a negative pressure trigger on the pipettor. Some pipets guns are provided with a universal nose piece attachment for cooperating and communicating with pipets of various lengths and diameters. An example of a pipettor is the Corning® Stripettor™ Ultra Pipet Controller.

Pipet controllers may be used with holders, holsters, or stand for holding or storing the pipet controller when not in use. However, such holders may not be configured in a way that allows an operator of the pipet controller to quickly or easily place the pipet controller in the holder for storage or retrieve the pipet controller from the holder for use. This slight inconvenience may have been taken for granted because it was not perceived as interfering with the operator's primary use of the pipet controller (e.g., transferring liquid), since the operator must only place or retrieve the pipet controller at the start and end of use. However, this view does not reflect the real-world conditions in which many operators work. For example, an operator of a pipet controller may have a need to put down and pick up the pipet controller repeatedly during use. In some case, the operator may want to put down the pipet controller while a pipet is still attached to the nozzle of the controller. However, due to the length of many pipets and the design of the pipet controllers, an attached pipet my come into contact with an environmental surface (e.g., a lab countertop) and be physically damaged or contaminated. Thus, any interference with these actions due to the configuration of the holder can lead to inefficient use of time and resources.

There is a need for pipet controller stands that enable efficient and convenient workflows and handling for operators of pipet controllers, while allowing for attached pipets to avoid contact with potentially contaminating or damaging surfaces in the laboratory environment.

SUMMARY

According to an embodiment of this disclosure, a stand for a pipet controller is provided. The stand includes a housing having a cradle arranged to hold a pipet controller in at least three distinct orientations relative to the housing. The housing further includes a base, and a top side distanced from the base by one or more side walls extending from the base to the top side of the housing. The cradle is disposed in an opening in the top side of the housing. The at least three distinct orientations of the pipet controller can include: (i) a first orientation for storing the pipet controller when not in use, (ii) a second orientation for storing the pipet controller between intermittent uses such that a grip of the pipet controller is able to be gripped by a user of the pipet controller, and (iii) a third orientation for storing the pipet controller such that, if a pipet is connected to a pipet connector of the pipet controller, the connected pipet does not contact the stand nor a surface supporting the base of the stand.

In the first orientation, the pipet controller is in a vertical position. In the vertical position, the pipet controller is standing on a bottom of the grip, the bottom of the grip being supported within the cradle of the stand.

In the second orientation, the pipet controller is in an inclined position. In the inclined position, the pipet controller is tilted forward at an angle relative to an upright position of the pipet controller. According to some embodiments, the angle is from about 10 degrees to about 80 degrees, from about 20 degrees to about 70 degrees, from about 30 degrees to about 60 degrees, from about 40 degrees to about 50 degrees, or about 45 degrees. In the inclined position, at least one of the grip and the pipet connector of the pipet controller is supported within the cradle of the stand.

In the third orientation, according to at least one embodiment, the pipet controller is in a horizontal position with a distal side of the grip of the pipet controller disposed in the cradle, and with the pipet connector disposed above the stand. In the third orientation, the pipet connector is oriented such that a longitudinal axis of a pipet connected to the pipet connector is substantially parallel to the base.

According to another embodiment, a pipet controller kit is provided. The kit includes a pipet controller including a grip to be gripped by a hand of a user; a pipet connector to receive a pipet at a top end of the pipet opposite to a bottom end that dispenses liquid therefrom; and a middle portion connecting the grip to the pipet connector. The kit further includes a stand for holding the pipet controller. The stand includes a housing having a cradle arranged to hold a pipet controller in at least three distinct orientations relative to the housing. The housing further includes a base, and a top side distanced from the base by one or more side walls extending from the base to the top side of the housing. The cradle is disposed in an opening in the top side of the housing.

According to another embodiment, a stand for a pipet controller is provided that includes a housing with a cradle arranged to hold a pipet controller, and a charging means disposed within the cradle. The cradle can hold the pipet controller in at least three distinct orientations relative to the housing, and the charging means can charge the pipet controller while held in the cradle in at least one of the three orientations. The housing further can further include a base; and a top side distanced from the base by one or more side walls extending from the base to the top side of the housing. The cradle is disposed in an opening in the top side of the housing.

DETAILED DESCRIPTION

Figure 1:
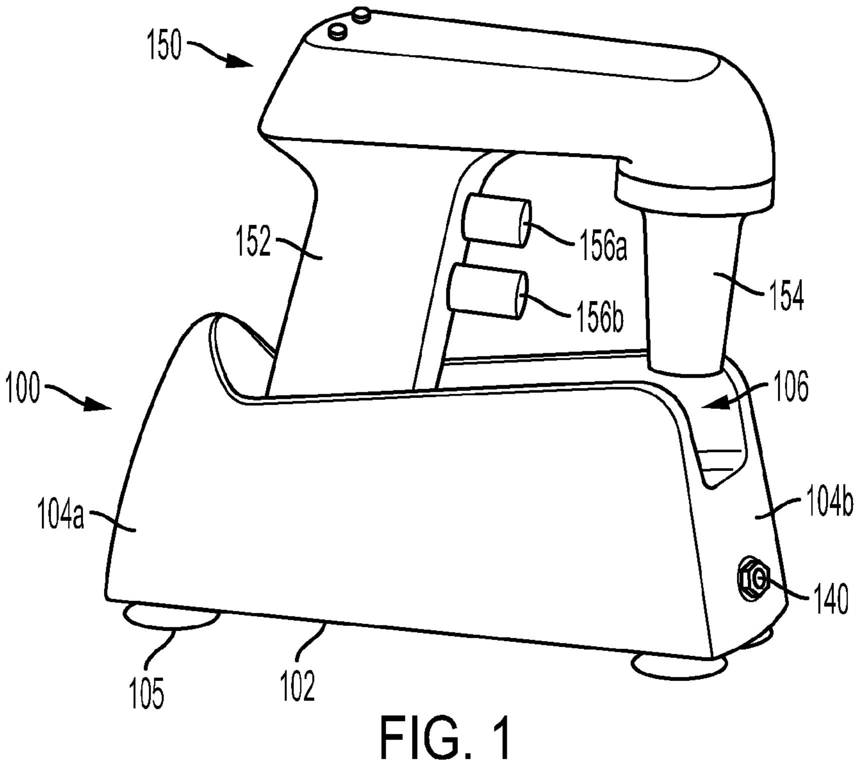
FIG. 1 is a perspective view of a pipet controller stand according to some embodiments of this disclosure, with a pipet controller in a first orientation within the stand.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

The following describes the inner workings of a pipet controller. This is for example only and to provide context for the functioning of a pipet controller and how it is used, and is not intended to be limiting on the types of pipet controllers that are compatible with embodiments of this disclosure. A pipet controller (e.g., pipet controller 150 in FIG. 1) can include, within its body, regulating means capable of operably regulating the flow of air to a connected pipet (e.g., pipet 160 in FIG. 3). For example, the pipet controller can include a valve assembly connected at one portion to a positive pressure source via a pressure duct and a negative air pressure source (i.e., a vacuum source) via a vacuum duct. The valve can be connected at another portion to a pipet flow duct. The air pressure source and vacuum source can be provided externally of the body of the pipet controller or can be incorporated directly within the body. The pipet flow duct is connected to the valve assembly at one end and extends through the body of the pipet controller to be connected at a second end to a pipet connector (e.g., pipet connector 154 in FIG. 1). Fluid communication through the pipet flow duct is therefore established between a valve assembly and pipet attached to the pipet connector.

To better understand the features and advantages of embodiments of this disclosure, the operation of a pipet controller will now be described. In operation, a pipet is attached to a pipet controller at the pipet connector, as described above. The end of the pipet is then submersed in a liquid to be drawn into the pipet. The operator then depresses a trigger (e.g., trigger 156*a* in FIG. 1), thus establishing a vacuum within a duct within the body of the pipet controller, that duct being in fluid communication with the pipet via the pipet connector. Thus, the vacuum causes a flow of fluid into the pipet. After a desired amount of liquid is drawn into the pipet, the trigger is released, ceasing the intake of fluid into the pipet. After placing the pipet in or above a container into which the liquid contained within the pipet is to be expelled, a trigger (e.g., trigger 156*b* in FIG. 1) is depressed, causing the release of the vacuum or application of positive pressure within a chamber in the pipet controller that is fluidly connected to the pipet. Thus, the desired amount of liquid within the pipet can be expelled into the receiving container.

The above operation of a pipet controller may be repeated many times by an operator. In the course of such operation, it may be necessary or desired for the operator to put down the pipet controller at various times. For example, an operator may need to put down the pipet controller for prolonged period when not in use, or for only brief periods of time to rest or to perform some other laboratory function. In the case of battery-powered electronic pipets, the pipet controller may also need to be charged by placing the pipet controller in a charger or otherwise connecting it to a power source. However, it may be awkward or inconvenient to set the pipet controller down when it has a long pipet attached. If the tip of the pipet contacts surfaces, such as a table, the pipet may be damaged, or the contents of the pipet may become contaminated or leak. For this and other reasons, a stand may be used to securely hold the pipet controller. Even so, such a stand may not typically be configured to hold a pipet controller while the pipet is attached, because a long pipet may still contact a surface due to the orientation of the controller on the stand. Thus, it may be required to remove the pipet before placing the controller in the stand, which adds time and wastes material. Furthermore, stands may not hold the pipet controller in a way that makes it convenient to repeatedly place and pickup of the pipet controller for short rests in the stand.

In view of the above problems, embodiments of this disclosure provide an improved stand for a pipet controller, including a charging stand for an electronic pipet controller, and methods of using the same. In particular, according to some embodiments, the stand allows for the pipet controller to be held in the stand in multiple orientations relative to the stand. As an aspect of some embodiments, the pipet controller may be placed in the stand in 2, 3, or more orientations. At least one orientation may be used to store the pipet controller in an upright position. At least one orientation may be used to store the pipet controller in an orientation that presents the grip of the pipet controller at an angle so that the grip can be easily and ergonomically grasped by the operator. At least one orientation may be used to store the pipet controller with the pipet attached. In the case of a battery-powered, rechargeable pipet controller, the stand is also a charger, and one or more of these orientations allows the pipet controller to be charged while disposed in the stand. In some embodiments, the pipet controller can be charged will held in an upright position within the stand.

Accordingly, embodiments of this disclosure provide a stand capable of holding a pipet controller in multiple orientations depending on the situation, including a long term or charging position, a short-term position that can be easily placed and picked-up, and a position that allows the pipet to remain attached. Thus, embodiments of this disclosure improve the efficiency and ease of use when operating a pipet controller. Further aspects of embodiments of this disclosure are discussed below with respect to the figures.

A stand for a handheld pipet controller is shown in FIG. 1, according to some embodiments. The stand 100 has a base 102 that rests on an underlying support or surface, optionally with one or more feet 105 attached to the base 102. The stand 100 further includes one or more sidewalls 104*a*, 104*b* (See also sidewalls 104*c* and 104*d* in FIG. 4) extending from the base toward a top of the stand 100 where a cradle 106 is provided to accommodate a pipet controller 150. It is understood that the sidewalls can include distinct sidewalls joined at corners or intersections, or separate surfaces separated by a gap or other feature, or one or more continuous sidewalls with smooth transitions or curves around all or part of the stand 100.

According to some embodiments, the stand 100 includes one or more electrical components housed within the stand 100. These electrical components may communicate with external equipment through a port 140 provided on sidewall 104*b*. In some particular embodiments, such electrical components may include one or more electrodes for charging a battery-operated pipet controller. For example, the port 140 can be a power port for accepting power from an external source. As described later, the stand 100 can then include a charging electrode within the cradle 106 that is electrically connected to the port 140 and that is arranged to connect to a corresponding electrode on the pipet controller 150 for charging a battery within the pipet controller 150. However, embodiments are not limited to this particular arrangement. For example, it is contemplated that the port 140 can be operably connected to an inductive charging mechanism (e.g., an induction coil) within the stand 100 that is arranged to inductively charge the pipet controller 150 (e.g., via an induction coil within the controller). As an aspect in some embodiments, the port 140 can be used to communicate other information transferred between the pipet controller 150 and the stand 100 via corresponding electrodes or connections provided therebetween. In some embodiments, such information can be transmitted wirelessly between the pipet controller 150 and stand 100, and/or wirelessly from the stand 100 to a separate computer (e.g., desktop, laptop, smartphone, or control/monitoring station).

As shown in FIG. 1, the pipet controller 150 has a body with a grip 152 at one end and a pipet connector 154 at another end of the body. The pipet connector 154 may include a generally cylindrical or conical with the opening (not shown) on the bottom for engaging with a pipet. The pipet controller 150 has triggers 156*a*, 156*b* to control aspirating and dispensing of liquid through a pipet, and may include additional buttons, triggers, or controls for performing various functions (e.g., pipet release). It is contemplated that embodiments of this disclosure are not limited to a pipet controller exactly as shown in FIG. 1. That is, embodiments of this disclosure can be used with other pipet controllers.

In FIG. 1, the pipet controller 150 is shown in a first orientation while in the stand 100. As will be discussed in more detail below, an aspect of embodiments of this disclosure relates to a stand that can store a pipet controller in multiple orientations. For example, in some embodiments, this first orientation can be used when the pipet controller 150 needs to be charger, or for longer-term storage of the pipet controller. Other orientation may be used when the pipet controller is temporarily placed on the stand in a way that allows an operator to easily pick it up again. That is, one or more orientations may allow for a more ergonomic or user-friendly positioning of the pipet controller on the stand, which can be especially helpful when the pipet controller may be repeatedly placed upon the stand and picked up again. In addition, one or more other orientations may allow the pipet controller to be place on the stand while a pipet is attached to the pipet controller. As used herein, "orientation" is used to describe the position of a pipet controller relative to the stand 100 when the pipet controller is stored in or held by the stand.

The first orientation in the embodiment shown in FIG. 1, can be characterized as the pipet controller 150 being in a generally upright position. In the upright position, the handle 152 and pipet connector 154 are generally vertical, and a central part of the pipet controller connecting the handle 152 and pipet connect 154 is generally horizontal. "Generally vertical" and "generally horizontal" are intended to mean that those portions are approximately vertical and horizontal, respectively, without being at a precise angle (e.g., 90 degrees or 0 degrees). For example, the grip 152 of the pipet controller 150 is angled slightly and thus may be considered at an angle with respect to a bottom surface of the grip or with respect to the base 102 of the stand 100. Vertical and horizontal, as discussed herein, are relative to a coordinate system defined by the stand 100, where the base 102 of the stand defines a horizontal plane of the coordinate system, and a vertical direction of the coordinate system extends upward (as viewed in FIG. 1) from the base 102. The first orientation can also be characterized as the pipet controller 150 effectively standing on a bottom of the grip 152.

Figure 2:
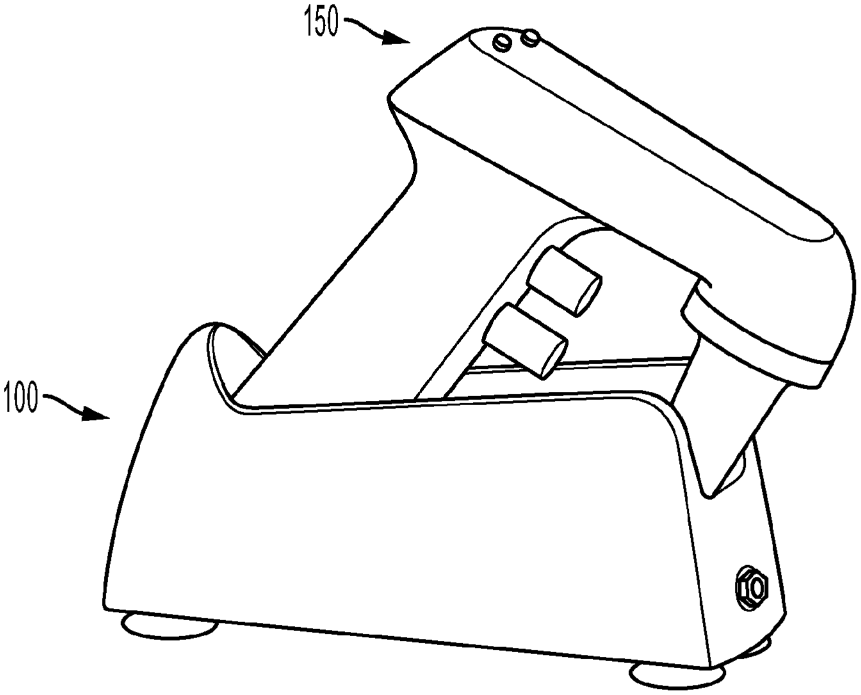
FIG. 2 is a perspective view of the pipet controller stand of FIG. 1 according to some embodiments, with a pipet controller in a second orientation within the stand.

FIG. 2 shows the pipet controller 150 disposed in the stand 100 in a second orientation. As compared to FIG. 1, where the pipet controller 150 was shown in the upright position of the first orientation, the second orientation puts the pipet controller 150 in a tilted or angled position, according to one or more embodiments. In particular, the pipet controller 150 is tilted so that the pipet connector 154 is lower than in the first orientation. The grip 152 is thus also tilted forward, such that the grip 152 is at an angle relative to the horizontal plane of the base 102 of the stand. As an aspect of some embodiments, the pipet connector 154 rests against a surface within the cradle 106, as shown in FIG. 2 and as further described below.

While it is possible for an operator to grasp the grip 152 of the pipet controller 150 while in the first orientation of FIG. 1, the upright positioning of the grip 152 in the first orientation can require radial deviation (or radial flexion) of the operator's wrist when placing the pipet controller 150 in the stand 100 or when picking it up from the stand 100. This angling of the wrist is due in part to the height of the surface (e.g., countertop or lab bench) on which the stand 100 sits. However, in the second orientation, the grip 152 is at a more comfortable angle when the stand 100 sits on a countertop or lab bench. Thus, if an operator intends to place the pipet controller 150 on the stand for a short or intermittent period, the operator may choose to place the pipet controller 150 in the second orientation (FIG. 2) rather than the first orientation (FIG. 1), so that the operator can enjoy more ergonomic operating conditions, and thus a decreased likelihood of work-related injuries or discomfort, such as repetitive stress injuries or carpal tunnel syndrome.

Figure 3:
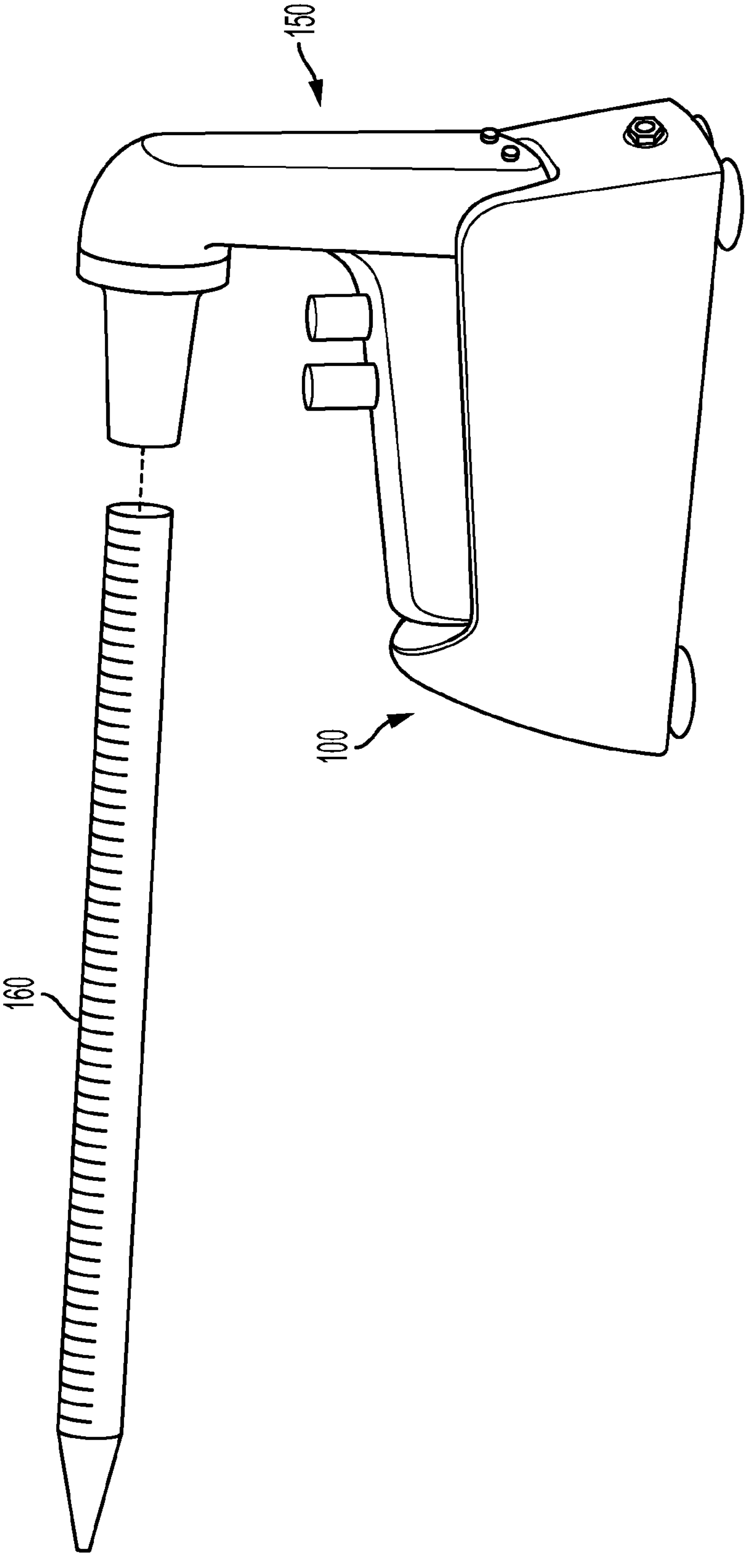
FIG. 3 is a perspective view of the pipet controller stand of FIGS. 1 and 2 according to some embodiments, with a pipet controller in a third orientation within the stand and a pipet that connects to the pipet controller nozzle.

FIG. 3 shows the pipet controller 150 disposed in the stand 100 in a third orientation. In the third orientation, according to some embodiments, the pipet controller 150 is in a generally horizontal position. In the generally horizontal position, the pipet connector 154 is horizontal such that any pipet 160 attached to the pipet connector 154 can be held aloft from and not touch the stand 100 or any surface (e.g., countertop) on which the stand 100 is placed. The third orientation can also allow convenient attachment or detachment of a pipet 160 from the pipet connector 154.

Figure 4:
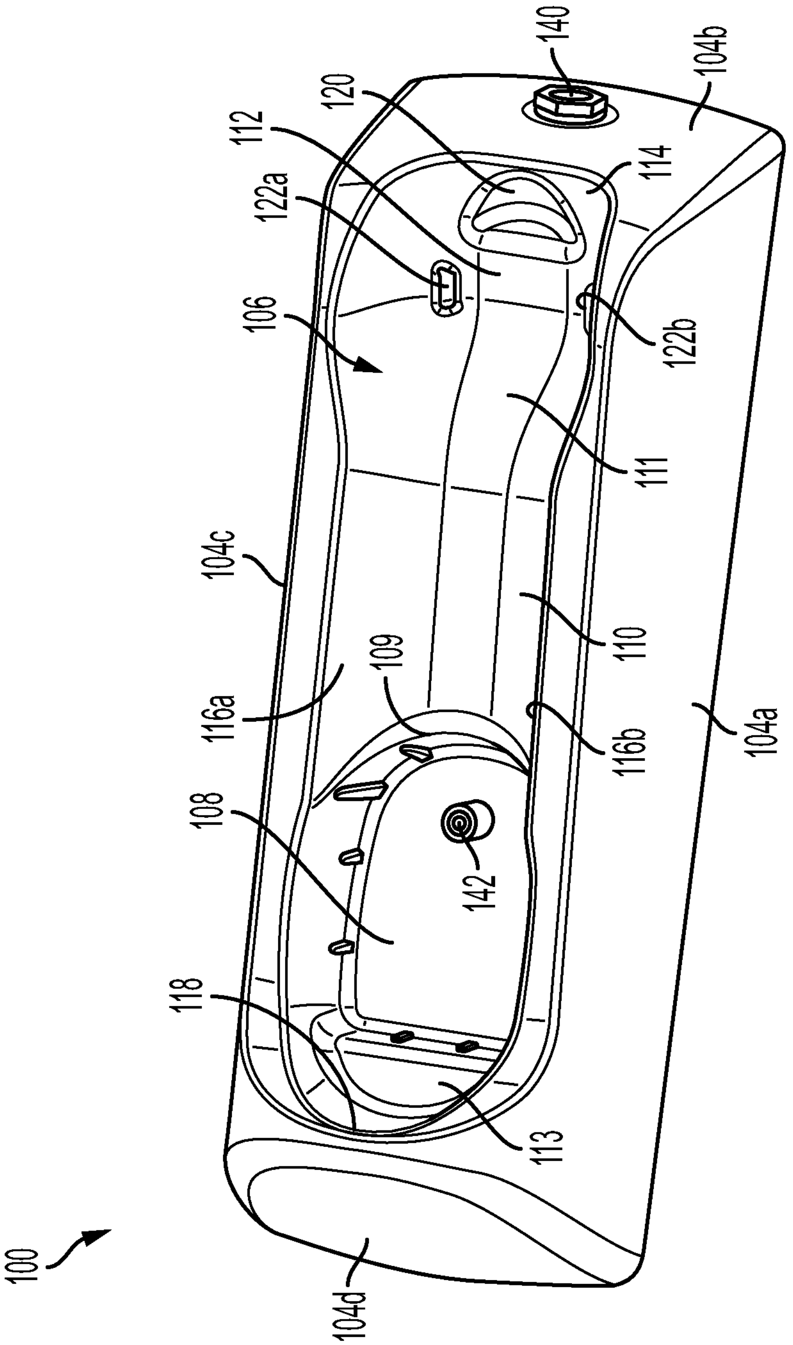
FIG. 4 is a perspective view from above the pipet controller stand according to some embodiments, showing a cradle of the stand that accommodates a pipet controller in multiple orientations.
Figure 5:
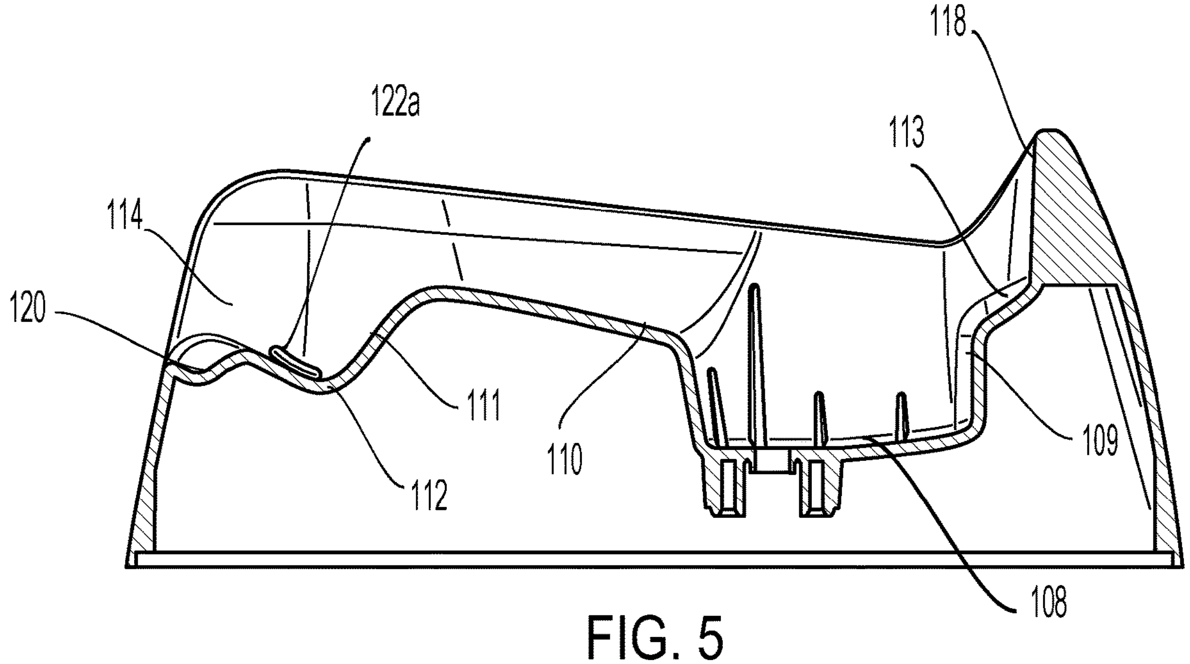
FIG. 5 is a cross-section view of the pipet controller stand of FIG. 4.

Further features of the stand 100 are shown in FIGS. 4 and 5, according to some embodiments. In particular, detailed aspects of an embodiment of the cradle 106 are shown in FIGS. 4 and 5. The cradle 106 is formed as a cavity or depression within the stand 100, at least partially bounded by the sidewalls 104*a*, 104*b*, 104*c*, and 104*d*. At a distal end of the cradle (i.e., the far end of the cradle 106 relative to the cradle opening 114 in sidewall 104*b*), a grip housing space is formed to house the bottom of the grip 152 of a pipet controller 150 when in the first orientation. The grip housing space is defined by a bottom surface 108 of the cradle 106 that is at least partially bound by a sidewall 109. The grip housing space is arranged to allow a pipet controller 150 to be disposed in the stand 100 in a first orientation (see FIG. 1), such that the pipet controller 150 is held upright. Thus, the grip housing space has a shape defined by the bottom surface 108 and sidewall 109 that conform closely to at least a bottom portion of the grip 152 of the pipet controller 150. In some embodiments, the grip housing portion may include support flanges on the sidewall 109 that guide the grip 152 into the proper position within the grip housing portion and may also apply pressure to the grip 152 to help support the upright position of the pipet controller 150 in the first orientation.

As an aspect of some embodiments, an electrical interface 142 is provided in the bottom surface 108. In some embodiments, the interface 142 is a charging port that is arranged to make contact with a charging electrode in the bottom of the grip 152 of a pipet controller 150. This interface 142 or charging port is operably connected to the port 140 at the proximal end of the stand 100 near the opening 114 of the cradle 106. It is contemplated that the interface 142 may also be used to send or receive information to or from the pipet controller 150.

Between the grip housing portion and the opening 114, the cradle 106 further includes a raised bottom wall 110, according to some embodiments. The raised bottom wall 110 can be shaped to support the pipet controller 150 when in at least one of the second and third orientations. For example, the raised bottom wall 110 may be raised to a position where a rear surface of the grip 152 rests on at least a portion of the raised bottom wall 110 in the third orientation. Longitudinal sidewalls 116*a,* 116*b* extend between the raised bottom wall 110 and the tops of at least sidewalls 104*a,* 104*c*. According to some embodiments, the longitudinal sidewalls 116*a,* 116*b* may be arranged to provide additional support to the pipet controller 150 in at least one of the second and third orientations. In particular, when the pipet controller 150 is in the third orientation, the longitudinal sidewalls 116*a,* 116*b* can be sized and shaped to generally conform to a portion of the grip 152 of the pipet controller 150, thereby helping to hold the pipet controller 150 securely in the third orientation.

Moving further toward the opening 114, the cradle 106 may include a sloped bottom wall 111 where the cradle lowers from the raised bottom wall 110 to a lowered bottom wall 112 of the cradle 106. Similar to the raised bottom wall 110, the lowered bottom wall 112 may be positioned to support a rear surface of the grip 152 in the third orientation. The lowered bottom wall 112 may include one or more pipettor stabilizers 122*a,* 122*b* to contact the body of the pipet controller 150 when in the third orientation to provide additional support an maintain the pipet controller 150 in the third orientation.

When a pipet controller is held in the second orientation (e.g., pipet controller 150 in FIG. 2) a portion of the bottom of the grip 152 of the pipet controller 150 can rest in a distal portion of the bottom surface 108 without be interfered with by the interface 142 (e.g., charging port or electrode). Optionally, the cradle 106 can be provided with a distal shelf 113 at a height above the bottom wall 108. The distal shelf 113 has a substantially horizontal surface (113) that is sized to extend a distance of a distal sidewall 118 of the cradle 106 such that, when a pipet controller 150 is placed in the second orientation within the stand 100, a front portion of the bottom of the grip 152 can rest on the horizontal surface of the distal shelf 113. Also, the distal sidewall 118 can optionally provide a rear support for the bottom of the grip 152 of pipet controller 150. In this way, when the pipet controller 150 is in the second orientation, the bottom of the grip 152 can be securely held by the stand 100.

In addition, as an aspect of some embodiments, the cradle 106 includes a pipet connector rest 120 in a proximal end of the cradle 106, near the cradle opening 114. The pipet connector rest 120 is positioned so that, when the pipet controller 150 is in the second orientation, a portion of the pipet connector 154 is supported by the pipet connector rest 120. The pipet connector rest 120 can form a void in the approximate shape of a cylindrical wedge to accommodate the approximately cylindrical shape of the pipet connector 154. However, in aspects of some embodiments, the pipet connector rest 120 can have a different shape as necessary to accommodate the shape of the pipet connector.

In addition, the pipet connector rest 120 may be shaped as a raised portion within the cradle 106, where the pipet connector 154 rests against the raised portion of the rest 120 so that the pipet connector 150 can be held at a desired angle that is comfortable for the operator of the pipet connector. In some embodiments, the height of the pipet connector 154 is customizable so that a comfortable angle of the pipet controller in the second orientation can be easily achieved.

As discussed above, embodiments of this disclosure relate to a stand for holding a pipet controller in multiple orientations. In some embodiments, the stand is also a charger for charging the pipet controller when held in at least one of those orientations. As a charger, the stand is equipped with any suitable charging means known to those skilled in the art. For example, the charging means can be an electrode arranged to make electrical contact with an electrode in the pipet controller, the electrode of the stand being electrically connected or connectable to a power source. As another example, the charging means can be an inductive charging means, such as a induction coil, within the charging stand, the inductive charging means being capable of inductively charging the pipet controller by a corresponding induction coil in the pipet controller.

Further details of aspects of embodiments are described below. It is contemplated that any aspects described herein are compatible with all disclosed embodiments, and can thus be combined in any combination.

As discussed above, embodiments of this disclosure are directed to a stand for a pipet controller. The stand can include a housing having a cradle arranged to hold a pipet controller in at least three distinct orientations relative to the housing. The housing can further include a base, and a top side distanced from the base by one or more side walls extending from the base to the top side of the housing. The cradle is disposed in an opening in the top side of the housing.

According to at least one embodiment, the at least three distinct orientations of the pipet controller can include: (i) a first orientation for storing the pipet controller when not in use, (ii) a second orientation for storing the pipet controller between intermittent uses such that a grip of the pipet controller is able to be gripped by a user of the pipet controller, and (iii) a third orientation for storing the pipet controller such that, if a pipet is connected to a pipet connector of the pipet controller, the connected pipet does not contact the stand nor a surface supporting the base of the stand.

In the first orientation, the pipet controller is in a vertical position. In the vertical position, the pipet controller is standing on a bottom of the grip, the bottom of the grip being supported within the cradle of the stand.

In the second orientation, the pipet controller is in an inclined position. In the inclined position, the pipet controller is tilted forward at an angle relative to an upright position of the pipet controller. According to some embodiments, the angle is from about 10 degrees to about 80 degrees, from about 20 degrees to about 70 degrees, from about 30 degrees to about 60 degrees, from about 40 degrees to about 50 degrees, or about 45 degrees. In the inclined position, at least one of the grip and the pipet connector of the pipet controller is supported within the cradle of the stand.

In the third orientation, according to at least one embodiment, the pipet controller is in a horizontal position with a distal side of the grip of the pipet controller disposed in the cradle, and with the pipet connector disposed above the stand. In the third orientation, the pipet connector is oriented such that a longitudinal axis of a pipet connected to the pipet connector is substantially parallel to the base.

The housing can further include a charging means disposed within the cradle, the charging means being arranged to charge the pipet controller while held in the cradle in at least one of the three orientations. The stand can also include a power supply means for supplying power to the charging means. The power supply means can include at least one of a battery, and a power port, the power port being configured to supply power to the charging means via an external power supply. The charging means can be at least one of an electrode configured to electrically couple with an electrode in the pipet controller, and an inductive charging coil configured to inductively couple with an inductive coil in the pipet controller.

According to some embodiments, the cradle includes a bottom surface that has a variable height. The cradle can include a first portion arranged to support a bottom of a grip of the pipet controller in the first orientation. The first portion is substantially flat, and can include the charging means arranged to charge the pipet controller via a charging input disposed in the grip of the pipet controller.

According to one or more embodiments, the pipet controller includes a grip to be gripped by a hand of a user; a pipet connector to receive a pipet at a top end of the pipet opposite to a bottom end that dispenses liquid therefrom; and a middle portion connecting the grip to the pipet connector. The grip can have one or more controls for controlling operation of the pipet via the pipet connector.

According to some embodiments, a pipet controller kit is provided. The kit includes a pipet controller including a grip to be gripped by a hand of a user; a pipet connector to receive a pipet at a top end of the pipet opposite to a bottom end that dispenses liquid therefrom; and a middle portion connecting the grip to the pipet connector. The kit further includes a stand according to any one of the above-described aspects or embodiments.

According to some embodiments, a stand for a pipet controller is provided that includes a housing with a cradle arranged to hold a pipet controller, and a charging means disposed within the cradle. The cradle can hold the pipet controller in at least three distinct orientations relative to the housing, and the charging means can charge the pipet controller while held in the cradle in at least one of the three orientations. The housing further can further include a base; and a top side distanced from the base by one or more side walls extending from the base to the top side of the housing. The cradle is disposed in an opening in the top side of the housing.

The at least three distinct orientations can include: (i) a first orientation for storing the pipet controller when not in use, (ii) a second orientation for storing the pipet controller between intermittent uses such that a grip of the pipet controller is able to be gripped by a user of the pipet controller, and (iii) a third orientation for storing the pipet controller such that, if a pipet is connected to a pipet connector of the pipet controller, the connected pipet does not contact the stand nor a surface supporting the base of the stand.

In the first orientation, the pipet controller is in a vertical position, where the pipet controller is standing on a bottom of the grip, and the bottom of the grip being supported within the cradle of the stand. In the second orientation, the pipet controller is in an inclined position, where the pipet controller is tilted forward at an angle relative to an upright position of the pipet controller. The angle is from about 10 degrees to about 80 degrees, from about 20 degrees to about 70 degrees, from about 30 degrees to about 60 degrees, from about 40 degrees to about 50 degrees, or about 45 degrees. In the inclined position, at least one of the grip and the pipet connector of the pipet controller is supported within the cradle of the stand. In the third orientation, the pipet controller is in a horizontal position with a distal side of the grip of the pipet controller disposed in the cradle, and with the pipet connector disposed above the stand. In the third orientation, the pipet connector is oriented such that a longitudinal axis of a pipet connected to the pipet connector is substantially parallel to the base.

The cradle comprises a first portion configured to support a bottom of a grip of the pipet controller in the first orientation, the first portion being substantially flat.

Illustrative Implementations

The following is a description of various aspects of implementations of the disclosed subject matter. Each aspect may include one or more of the various features, characteristics, or advantages of the disclosed subject matter. The implementations are intended to illustrate a few aspects of the disclosed subject matter and should not be considered a comprehensive or exhaustive description of all possible implementations.

Aspect 1 pertains to a stand for a pipet controller comprising: a housing comprising a cradle configured to hold a pipet controller in at least three distinct orientations relative to the housing.

Aspect 2 pertains to the stand of Aspect 1, wherein the housing further comprises: a base; and a top side distanced from the base by one or more side walls extending from the base to the top side of the housing.

Aspect 3 pertains to the stand of Aspect 2, wherein the cradle is disposed in an opening in the top side of the housing.

Aspect 4 pertains to the stand of any one of Aspects 1-3, wherein the at least three distinct orientations comprise: a first orientation for storing the pipet controller when not in use, a second orientation for storing the pipet controller between intermittent uses such that a grip of the pipet controller is able to be gripped by a user of the pipet controller, and a third orientation for storing the pipet controller such that, if a pipet is connected to a pipet connector of the pipet controller, the connected pipet does not contact the stand nor a surface supporting the base of the stand.

Aspect 5 pertains to the stand of Aspect 4, wherein, in the first orientation, the pipet controller is in a vertical position.

Aspect 6 pertains to the stand of Aspect 5, wherein, in the vertical position, the pipet controller is standing on a bottom of the grip, the bottom of the grip being supported within the cradle of the stand.

Aspect 7 pertains to the stand of Aspect 4 or Aspect 6, wherein, in the second orientation, the pipet controller is in an inclined position.

Aspect 8 pertains to the stand of Aspect 7, wherein, in the inclined position, the pipet controller is tilted forward at an angle relative to an upright position of the pipet controller.

Aspect 9 pertains to the stand of Aspect 8, wherein the angle is from about 10 degrees to about 80 degrees, from about 20 degrees to about 70 degrees, from about 30 degrees to about 60 degrees, from about 40 degrees to about 50 degrees, or about 45 degrees.

Aspect 10 pertains to the stand of any one of Aspects 4 to 9, wherein, in the inclined position, at least one of the grip and the pipet connector of the pipet controller is supported within the cradle of the stand.

Aspect 11 pertains to the stand of any one of Aspects 4-10, wherein, in the third orientation, the pipet controller is in a horizontal position with a distal side of the grip of the pipet controller disposed in the cradle, and with the pipet connector disposed above the stand.

Aspect 12 pertains to the stand of any one of Aspects 4-11, wherein, in the third orientation, the pipet connector is oriented such that a longitudinal axis of a pipet connected to the pipet connector is substantially parallel to the base.

Aspect 13 pertains to the stand of any one of Aspects 1-12, wherein the housing further comprises a charging means disposed within the cradle, the charging means being configured to charge the pipet controller while held in the cradle in at least one of the three orientations.

Aspect 14 pertains to the stand of Aspect 13, wherein the stand comprises a power supply means for supplying power to the charging means.

Aspect 15 pertains to the stand of Aspect 14, wherein the power supply means comprises at least one of a battery, and a power port, the power port being configured to supply power to the charging means via an external power supply.

Aspect 16 pertains to the stand of any one of the preceding Aspects, wherein the cradle comprises a bottom surface that has a variable height.

Aspect 17 pertains to the stand of any one of the Aspects 13-16, wherein the charging means is at least one of an electrode configured to electrically couple with an electrode in the pipet controller, and an inductive charging coil configured to inductively couple with an inductive coil in the pipet controller.

Aspect 18 pertains to the stand of any one of Aspects 1-17, wherein the cradle comprises a first portion configured to support a bottom of a grip of the pipet controller in the first orientation.

Aspect 19 pertains to the stand of Aspect 18, wherein the first portion is substantially flat.

Aspect 20 pertains to the stand of Aspect 18 or Aspect 19, wherein the first portion comprises the charging means configured to charge the pipet controller via a charging input disposed in the grip of the pipet controller.

Aspect 21 pertains to the stand of any one of Aspects 1-20, wherein the pipet controller comprises: a grip configured to be gripped by a hand of a user; a pipet connector configured to receive a pipet at a top end of the pipet opposite to a bottom end that is configured to dispense liquid therefrom; and a middle portion connecting the grip to the pipet connector.

Aspect 22 pertains to the stand of Aspect 21, wherein the grip comprises one or more controls for controlling operation of the pipet via the pipet connector.

Aspect 23 pertains to a pipet controller kit comprising: a pipet controller comprising: a grip configured to be gripped by a hand of a user; a pipet connector configured to receive a pipet at a top end of the pipet opposite to a bottom end that is configured to dispense liquid therefrom; and a middle portion connecting the grip to the pipet connector; and a stand according to any one of Aspects 1-22.

Aspect 24 pertains to a stand for a pipet controller, comprising: a housing comprising a cradle configured to hold a pipet controller, and a charging means disposed within the cradle, wherein the cradle is configured to hold the pipet controller in at least three distinct orientations relative to the housing, and wherein the charging means is configured to charge the pipet controller while held in the cradle in at least one of the three orientations.

Aspect 25 pertains to the stand of Aspect 24, wherein the housing further comprises:

- a top side distanced from the base by one or more side walls extending from the base to the top side of the housing.

Aspect 26 pertains to the stand of Aspect 25, wherein the cradle is disposed in an opening in the top side of the housing.

Aspect 27 pertains to the stand of any one of Aspects 24-26, wherein the at least three distinct orientations comprise: a first orientation for storing the pipet controller when not in use, a second orientation for storing the pipet controller between intermittent uses such that a grip of the pipet controller is able to be gripped by a user of the pipet controller, and a third orientation for storing the pipet controller such that, if a pipet is connected to a pipet connector of the pipet controller, the connected pipet does not contact the stand nor a surface supporting the base of the stand.

Aspect 28 pertains to the stand of Aspect 27, wherein, in the first orientation, the pipet controller is in a vertical position.

Aspect 29 pertains to the stand of Aspect 28, wherein, in the vertical position, the pipet controller is standing on a bottom of the grip, the bottom of the grip being supported within the cradle of the stand.

Aspect 30 pertains to the stand of any one of Aspects 27-29, wherein, in the second orientation, the pipet controller is in an inclined position.

Aspect 31 pertains to the stand of Aspect 30, wherein, in the inclined position, the pipet controller is tilted forward at an angle relative to an upright position of the pipet controller.

Aspect 32 pertains to the stand of Aspect 31, wherein the angle is from about 10 degrees to about 80 degrees, from about 20 degrees to about 70 degrees, from about 30 degrees to about 60 degrees, from about 40 degrees to about 50 degrees, or about 45 degrees.

Aspect 33 pertains to the stand of any one of Aspects 30 to 32, wherein, in the inclined position, at least one of the grip and the pipet connector of the pipet controller is supported within the cradle of the stand.

Aspect 34 pertains to the stand of any one of Aspects 27-33, wherein, in the third orientation, the pipet controller is in a horizontal position with a distal side of the grip of the pipet controller disposed in the cradle, and with the pipet connector disposed above the stand.

Aspect 35 pertains to the stand of any one of Aspects 27-34, wherein, in the third orientation, the pipet connector is oriented such that a longitudinal axis of a pipet connected to the pipet connector is substantially parallel to the base.

Aspect 36 pertains to the stand of any one of Aspects 27-35, wherein the cradle comprises a first portion configured to support a bottom of a grip of the pipet controller in the first orientation.

Aspect 37 pertains to the stand of Aspect 36, wherein the first portion is substantially flat.

Definitions

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Specific and preferred values disclosed for components, ingredients, additives, dimensions, conditions, and like aspects, and ranges thereof, are for illustration only; they do not exclude other defined values or other values within defined ranges. The systems, kits, and methods of the disclosure can include any value, or any combination of the values, specific values, more specific values, and preferred values described herein, including explicit or implicit intermediate values and ranges.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed:

1. A stand for a pipet controller, comprising:

a base comprising a first side and a second side on an opposite end of the base form the first side;

a top side distanced from the base by one or more side walls extending from the base to the top side of the housing, the one or more side walls extending at least partially in a direction from the first side to the second side; and a housing comprising a cradle configured to hold a pipet controller in at least three distinct orientations relative to the housing, wherein the cradle comprises:

a grip housing space comprising a bottom surface at least partially bounded by the one or more side walls, the grip housing space being disposed in the first side and being configured for housing a bottom of a grip of the pipet controller in a first orientation of the at least three distinct orientations, a raised bottom wall for supporting the pipet controller in a second orientation and a third orientation, the raised bottom wall being disposed at a height between a height of the bottom surface of the grip housing space and a height of the top side, and a pipet connector rest disposed in the second side and configured for supporting a portion of a pipet connector of the pipet controller in the second orientation.

2. The stand of claim 1, wherein the cradle is disposed in an opening in the top side of the housing.

3. The stand of claim 1, wherein the at least three distinct orientations comprise:

the first orientation for storing the pipet controller when not in use, the second orientation for storing the pipet controller between intermittent uses such that a grip of the pipet controller is able to be gripped by a user of the pipet controller, and the third orientation for storing the pipet controller with a pipet connected to a pipet connector of the pipet controller such that the pipet does not contact the stand nor a surface supporting the base of the stand.

4. The stand of claim 3, wherein the bottom surface of the grip housing space is shaped and sized to support the bottom of the grip of the pipet controller in the first orientation, and wherein, in the first orientation, the pipet controller is adapted to be in a vertical position.

5. The stand of claim 3, wherein, in the second orientation, the stand is adapted to hold the pipet controller in an inclined position.

6. The stand of claim 5, wherein, in the inclined position, the stand is adapted to hold the pipet controller tilted forward at an angle relative to an upright position of the pipet controller.

7. The stand of claim 6, wherein the angle is from about 10 degrees to about 80 degrees, from about 20 degrees to about 70 degrees, from about 30 degrees to about 60 degrees, from about 40 degrees to about 50 degrees, or about 45 degrees.

8. The stand of claim 5, wherein, in the inclined position, the stand is adapted to support within the cradle of the stand at least one of the grip and the pipet connector of the pipet controller.

9. The stand of claim 3, wherein, in the third orientation, the stand is adapted to hold the pipet controller in a horizontal position with a distal side of the grip of the pipet controller adapted to be disposed in the cradle, and with the pipet connector adapted to be disposed above the stand.

10. The stand of claim 3, wherein, in the third orientation, the stand is adapted to support the pipet connector oriented such that a longitudinal axis of a pipet connected to the pipet connector is adapted to be substantially parallel to the base.

11. The stand of claim 3, wherein the cradle comprises a first portion configured to support a bottom of a grip of the pipet controller in the first orientation.

12. The stand of claim 11, wherein the first portion is substantially flat.

13. The stand of claim 11, wherein the first portion comprises a charging means configured to charge the pipet controller.

14. The stand of claim 1, wherein the housing further comprises a charging means disposed within the cradle, the charging means being configured to charge the pipet controller while held in the cradle in at least one of the three orientations.

15. The stand of claim 14, wherein the stand comprises a power supply means for supplying power to the charging means.

16. The stand of claim 15, wherein the power supply means comprises at least one of a battery, and a power port, the power port being configured to supply power to the charging means via an external power supply.

17. The stand of claim 14, wherein the charging means is at least one of an electrode configured to electrically couple with an electrode in the pipet controller, and an inductive charging coil configured to inductively couple with an inductive coil in the pipet controller.

18. The stand of claim 1, wherein the cradle comprises a bottom surface that has a variable height.

* * * * *